No. 644,157. Patented Feb. 27, 1900.
M. F. YOUNG.
THRESHING MACHINE.
(Application filed July 11, 1898.)
(No Model.) 2 Sheets—Sheet 2.
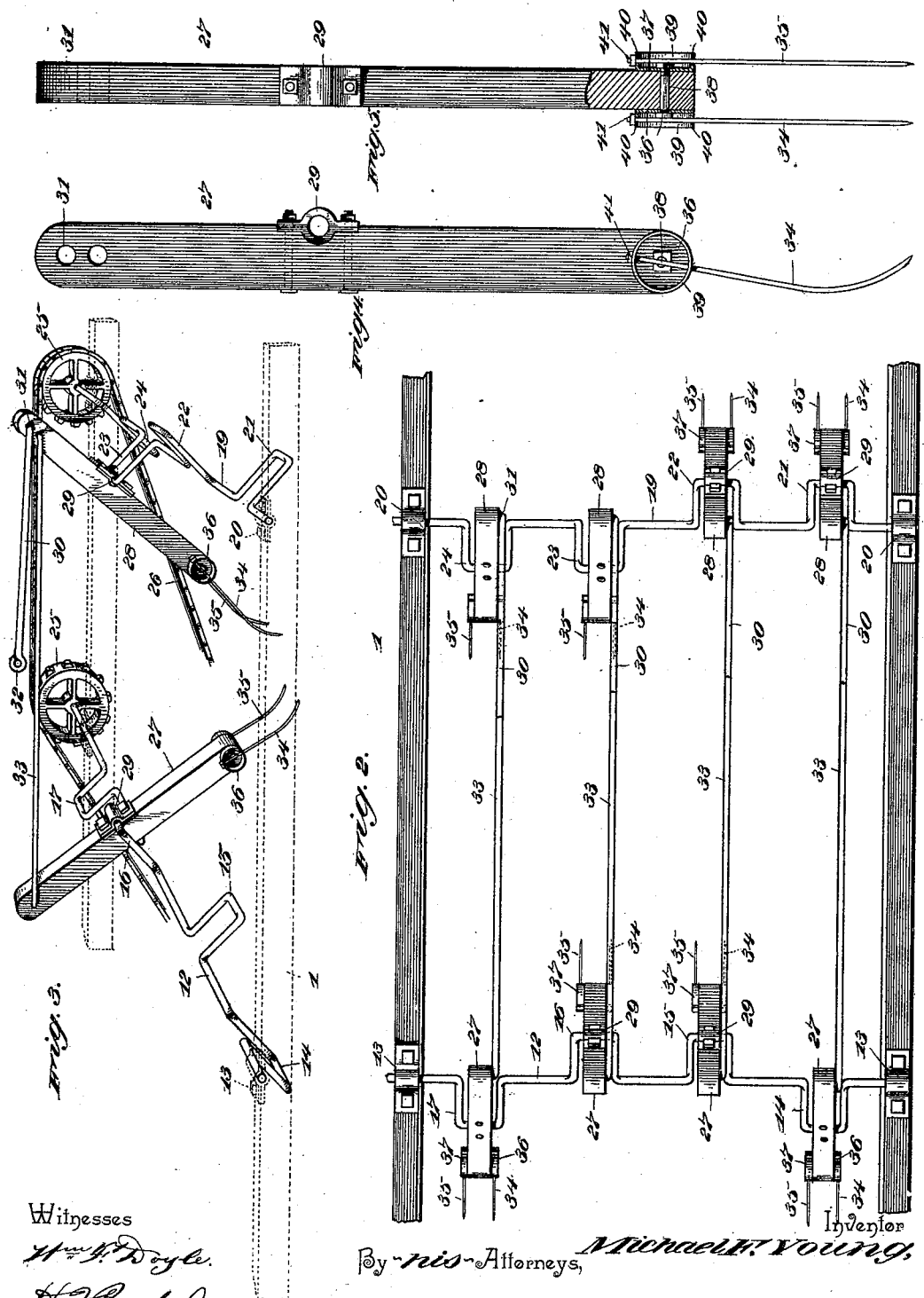
Witnesses
Wm. F. Doyle.
H. F. Beushef.
By his Attorneys,
C. A. Snow & Co.
Inventor
Michael F. Young.

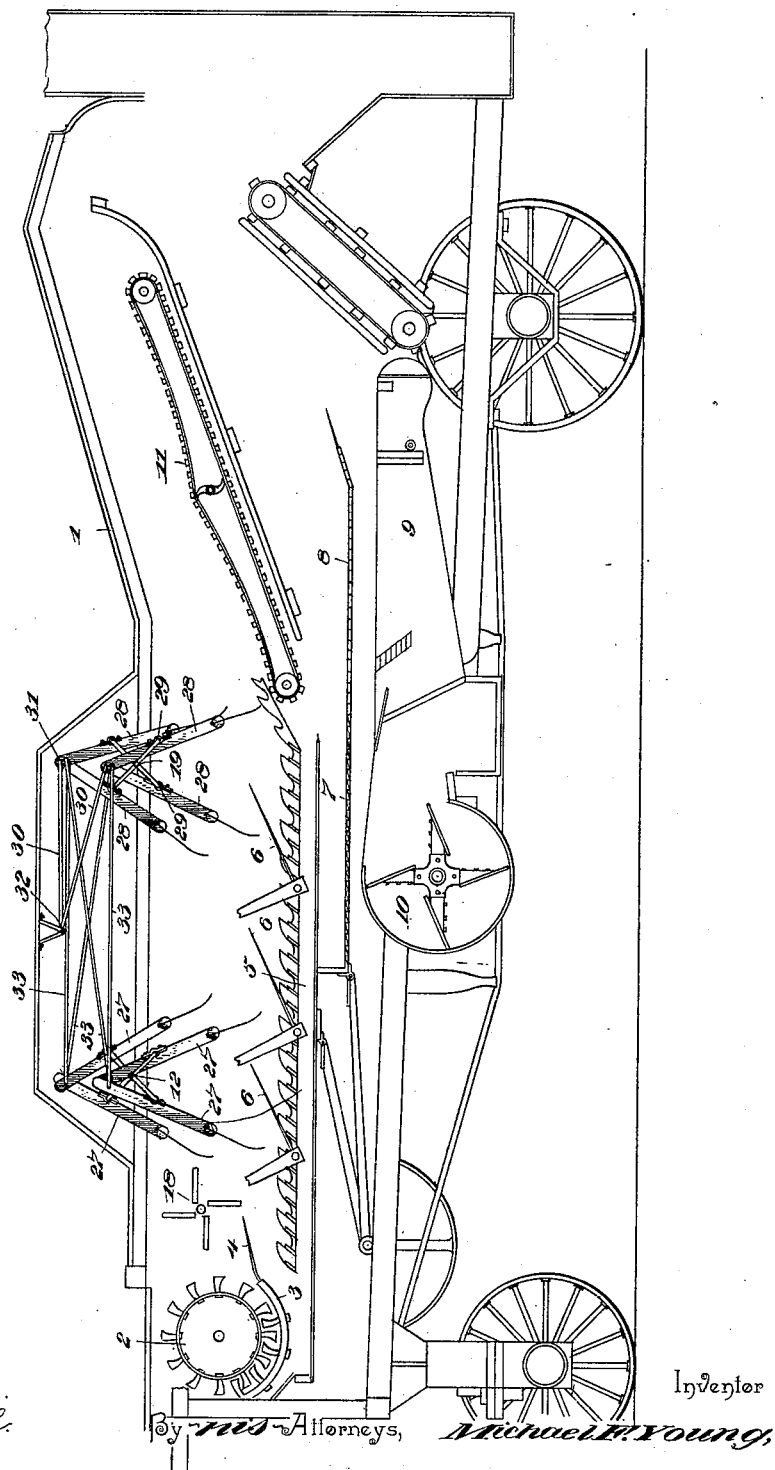

UNITED STATES PATENT OFFICE.

MICHEAL F. YOUNG, OF CHESTER, MICHIGAN.

THRESHING-MACHINE.

SPECIFICATION forming part of Letters Patent No. 644,157, dated February 27, 1900.

Application filed July 11, 1898. Serial No. 685,673. (No model.)

*To all whom it may concern:*

Be it known that I, MICHEAL F. YOUNG, a citizen of the United States, residing at Chester, in the county of Eaton and State of Michigan, have invented a new and useful Threshing-Machine, of which the following is a specification.

My invention relates to improvements in threshing-machines and separators; and one object that I have in view is to provide improved means by which the straw may be carried rapidly through the machine after leaving the cylinder and concave and be spread and agitated in its course over the grain-pans to effect the thorough separation of the grain from the straw and insure the precipitation of the grain upon the shaking-pans.

A further object of the invention is to provide improved means by which the straw agitator and pusher devices may be adjusted to regulate the lifting and feeding of the straw through the machine, to the end that the agitation and the rate of travel of the straw may be varied according to the conditions thereof.

With these ends in view the invention consists in the novel combination of elements and in the construction and arrangement of parts, which will be hereinafter fully described and claimed.

To enable others to understand the invention, I have illustrated the same in the accompanying drawings, forming a part of this specification, and in which—

Figure 1 is a vertical longitudinal sectional view through a threshing-machine or separator with a straw agitating and feeding mechanism embodied therein in accordance with my invention. Fig. 2 is a plan view of the parts shown by Fig. 1 with the deck of the separator removed. Fig. 3 is a perspective view of the cranked shafts and certain of the fork-bars omitted. Fig. 4 is an enlarged view, in side elevation, of one of the fork-bars, a tine, and an adjustable tine-head clamped thereto. Fig. 5 is a detail sectional elevation of the device as shown by Fig. 4.

Like numerals of reference denote like and corresponding parts in each of the several figures of the drawings.

1 designates a portion of the casing of an ordinary threshing-machine or separator which contains a rotary cylinder 2 and a concave 3, supported in operative relation to the cylinder and provided at its rear edge with a series of fingers 4. Extending longitudinally and horizontally through a part of the machine is the upper grain-pan 5, which carries a series of agitator-forks 6, which are arranged in inclined relation to the pan 5 and extend upwardly therefrom. The lower grain-pan 7 is arranged in a horizontal plane below the grain-pan 5 to have its forward end extend beneath the upper grain-pan 5, and the rear exposed end of this lower grain-pan 7 carries the chaffer 8, arranged to deliver the grain to the cleaning-shoe 9. The blast-fan 10 delivers the blast or current of air to the shaking-shoe 9 in the ordinary way, and above the chaffer is arranged the endless inclined raddle or conveyer 11, which is supported within the primary machine to have its front end receive the straw from the agitator-forks 6 and the upper grain-pan 5. This endless raddle extends from the upper grain-pan to the rear delivery end of the machine, and it serves to convey the straw from the grain-pan 5 out of the machine. All these devices are ordinary in the art, and they may be of any usual or any preferred construction. Such devices are shown and described merely for the purpose of illustrating a type of machine in which my improvements may be embodied, and I will therefore have it understood that I do not strictly confine myself to the use of my improvements in connection with the described parts of an ordinary thresher or separator.

My invention consists in the provision of a novel separating or agitating and feeding mechanism arranged to carry the straw quickly from the cylinder and concave and to impart violent agitating movement thereto for the purpose of quickly and thoroughly separating the grain from the straw.

In carrying my invention into practice I employ two crank-shafts of similar construction, which are arranged in the same horizontal plane within the machine-casing, and these crank-shafts support and actuate a series of fork-bars, which carry the tines that engage with the straw to lift and carry the same rearwardly through the machine and also agitate the straw. One of these crank-shafts is indicated by the numeral 12, and it is arranged in a horizontal position across the machine at a suitable elevation above the upper grain-pan 5 and in rear of the beater 18, which is contiguous to the thresher-cylinder. This crank-shaft is journaled in suitable bearings 13, which are rigidly secured to the framework of the machine, and said crank-shaft is constructed with a plurality of cranks 14, 15, 16, and 17, which occupy diverse angular positions to the axial line of the shaft. The other crank-shaft is indicated by the numeral 19, and it is arranged in a horizontal position across the machine at a suitable distance in rear of the crank-shaft 12, so that the axial lines of the two shafts are parallel and in the same horizontal plane. This rear crank-shaft 19 lies over the lower grain-pan 7 and at a proper distance in advance of the endless raddle or conveyer, and this crank-shaft 19 is journaled in suitable bearings 20, which are rigidly secured to the machine-frame. Said shaft 19 is provided or formed with a plurality of cranks 21, 22, 23, and 24, corresponding in number to the cranks of the shaft 12. By reference to Fig. 3 it will be observed that the relative position of no two cranks on rock-shaft is alike and that the opposite cranks of adjacent shafts also face in opposite directions. The two shafts 12 19 are arranged within the machine to have their cranks in the same vertical planes longitudinally of the machine, whereby the fork-bars, which are operatively fitted to the cranks of said shafts, may be connected in pairs, as will presently appear. One end of each crank-shaft is extended or prolonged beyond one side of the machine-casing, and to said prolonged ends of the shafts are secured the sprocket-wheels 25, which are operatively connected by an endless sprocket-chain 26, driven from one of the machine-shafts in any suitable way. The sprocket-wheels 25 on the crank-shafts are of corresponding size, and said wheels and chain drive the two crank-shafts at uniform speed.

The series of fork-bars 27 are operatively connected to the cranks of the shaft 12, and a similar series of fork-bars 28 are in like manner connected to the cranks of the shafts 19. I prefer to connect each fork-bar to its crank on one of the shafts at a point intermediate of the length of the fork-bar by means of a box or bearing 29, which is secured rigidly to one side of the fork-bar and receives the crank of the shaft for the crank to rotate freely therein and actuate the fork-bar to cause the latter to travel with the crank in the rotary motion of the shaft.

The fork-bars 27 on the cranks of the shaft 12 are arranged in the same vertical planes as the fork-bars 28 on the shaft 19, and each pair of bars is operatively connected together by the medium of the pitman 33, which has its respective ends pivotally connected to the upper extremities of the two forked bars on the shafts 12 and 19. The fork-bars 28 on the rear crank-shaft 19 are connected with the deck of the threshing-machine by means of rods 30, each of which is pivoted at one end to one of the fork-bars 28, as at 31, while the other end of said rod 30 is pivoted, as at 32, to the deck of the threshing machine or separator. These rods 30 thus serve to prevent the fork-bars 28 from turning idly around the crank-shaft 19 and getting out of position, while at the same time they permit the fork-bars to travel with the cranks of the shaft 19, so as to be depressed into the grain during a portion of the rotation of the cranks and to be retracted or lifted from the grain as the cranks complete their rotation. The pitmen 33 connect the front series of fork-bars 27 with the rear series of fork-bars 28, and these pitmen insure the correct positions of the front fork-bars 27 in relation to the crank-shaft 12. Each fork-bar carries a pair of tines 34 35, which are disposed on opposite sides of the bar and are clamped thereto for adjustment to different angular positions with relation to the longitudinal axis of said bar. The tines are made, preferably, of elastic wire or rod metal and they may be curved longitudinally, as shown by Fig. 4, or straight tines may be employed, at the option of the skilled constructor. These tines are fitted separately in the heads 36 and 37, which are applied to the opposite faces of the fork-bar, at or near the lower extremity thereof, and the two heads are secured to the fork-bar by a single bolt 38, which passes through a suitable opening in the fork-bar and through both of the heads. Each tine-head is provided with an annular flange 39, which projects beyond the exposed face of said head, and through this flange 39 are formed the openings 40, which lie diametrically opposite to each other and receive the upper extremity of one of the tines, a nut or nuts 41 being screwed on the tine to firmly fasten the latter to the head. The inner ends of the tines pass across the heads of the bolts at one side and the nuts on the bolts at the other side of the fork-bar, and thus serve to keep the bolts and their nuts in place. It will be understood that the bolt 38 may be loosened to permit the tine-heads 36 37 to be adjusted to different positions on the fork-bar, and thereby vary the angle of the tines 34 35 to the axis of said bar. The described construction of the heads permits the tines to be inclined forwardly or backwardly in relation to the fork-bar, or said tines may be adjusted to lie substantially in line with said fork-bar. This adjustment of the tines enables them to assume positions whereby they may be caused to quickly enter the straw and lift the same to a considerable distance above the grain-pan, or the tines may be adjusted to penetrate the straw for a limited extent, so as to vary the elevation of the straw and its rate of travel rearwardly through the machine.

The crank-shafts 12 19 may be mounted in their bearings to have the cranks of the two shafts occupy corresponding positions and insure movement to the same extent to each pair of connected fork-bars, thus making the tines on the two fork-bars operate in like manner to enter the straw simultaneously and be lifted and carried rearwardly to the same extent. Said crank-shafts may, however, be mounted in their bearings to have the cranks thereof occupy different positions, so as to actuate the forks of the two shafts at different intervals for the purpose of having the tines of the shafts enter the grain alternately.

The fork-tines lift the straw and carry it rearwardly, and the tines are thus made to serve the twofold purpose of separating and agitating the straw and feeding it rearwardly through the machine. Each pair of tines may be adjusted on its fork-bar independently of every other pair of tines, and the tines may occupy different angular positions on the fork-bars, so as to be inclined forward or backward thereon, whereby the tines may take the straw quickly or slowly, and they may be adjusted to vary the lifting thereof.

Changes may be made in the form of some of the parts while their essential features are retained and the spirit of the invention embodied. Hence I do no desire to be limited to the precise form of all the parts as shown, reserving the right to vary therefrom.

Although I have shown and described each crank-shaft as provided with a series of four cranks and the agitator mechanism as employing two shafts, I do not limit myself to the number of parts—that is to say, the number of cranks on each shaft may be increased or decreased and the number of shafts may be varied. Of course any variation in the number of shafts and in the number of cranks on each shaft will involve a corresponding variation in the number of fork-bars, the limiting-rods, and the connecting-pitmen.

Having thus described the invention, what I claim is—

1. In a threshing-machine, the overhung rake mechanism comprising the shafts arranged in the same horizontal plane, one in rear of the other, and each shaft provided with a plurality of cranks, the individual cranks on each shaft extending in different directions, the relative position of no two cranks on the same shaft being alike, and the opposite cranks of adjacent shafts also facing in different directions, gearing connecting the two shafts to drive them at a uniform speed, two series of fork-bars mounted respectively on the cranks of the shafts and provided with tines or fingers, links connecting one series of fork-bars with the framework of the machine, and other links connecting the fork-bars with each other, substantially as described.

2. In a machine of the class described, the fork-bar, the adjustable heads applied to opposite faces of the bar, the through-bolt connecting both heads to the bar, flanges on the heads, and tines secured to the flanges and passing across the ends of the bolt to hold it in place, substantially as described.

3. In an agitator and feeder mechanism for threshing-machines, a fork-bar, the adjustable heads clamped to the respective faces of the bar, and the pair of tines fastened directly to the respective heads and supported adjustably thereby on the bar, substantially as described.

4. In an agitator and feeding mechanism for threshing-machines, a fork-bar, the heads applied to opposite faces of the bar and provided with offstanding flanges, the tines fastened securely to said flanges of the heads and adjustable with the latter on the bar, and a through-bolt connecting the heads adjustably to said bar, substantially as described.

5. In an agitator and feeding mechanism for threshing-machines, the combination of the horizontal crank-shafts arranged one in rear of the other, two series of fork-bars fitted to the respective shafts, the heads clamped adjustably to said fork-bars and each pair of heads provided with tines which are adjustable on the bar independently of the movement or play of the fork-bar with its shaft, and links for limiting the movement of the fork-bars with their shafts, substantially as described.

In testimony that I claim the foregoing as my own I have hereto affixed my signature in the presence of two witnesses.

MICHEAL F. YOUNG.

Witnesses:
HOMER G. BARBER,
WM. C. ALSOVER.